US012416889B2

(12) United States Patent
Uehara et al.

(10) Patent No.: US 12,416,889 B2
(45) Date of Patent: Sep. 16, 2025

(54) FIXING DEVICE INCLUDING DISCHARGE GUIDE GUIDING SHEET PASSED THROUGH PRESSURIZED REGION AND IMAGE FORMING APPARATUS

(71) Applicant: KYOCERA Document Solutions Inc., Osaka (JP)

(72) Inventors: Masakazu Uehara, Osaka (JP); Tomohiro Watatani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/748,750

(22) Filed: Jun. 20, 2024

(65) Prior Publication Data

US 2024/0427264 A1 Dec. 26, 2024

(30) Foreign Application Priority Data

Jun. 22, 2023 (JP) ................................ 2023-102353

(51) Int. Cl.
*G03G 15/20* (2006.01)
*G03G 15/00* (2006.01)

(52) U.S. Cl.
CPC ..... *G03G 15/6552* (2013.01); *G03G 15/2028* (2013.01); *G03G 15/2035* (2013.01); *G03G 15/6573* (2013.01)

(58) Field of Classification Search
CPC ........... G03G 15/6552; G03G 15/2028; G03G 15/2032; G03G 15/2035; G03G 15/6573; G03G 2215/00417
USPC ........................................................ 399/322
See application file for complete search history.

(56) References Cited

U.S. PATENT DOCUMENTS

| | | | | |
|---|---|---|---|---|
| 10,509,361 B2 | 12/2019 | Wada et al. | | |
| 2006/0193666 A1* | 8/2006 | Tomatsu | G03G 15/657 | 399/401 |
| 2007/0253756 A1* | 11/2007 | Uehara | G03G 15/2028 | 399/322 |
| 2008/0131177 A1* | 6/2008 | Aratachi | G03G 15/70 | 399/323 |
| 2014/0339763 A1* | 11/2014 | Watatani | B65H 5/062 | 271/265.01 |

(Continued)

FOREIGN PATENT DOCUMENTS

| | | | | |
|---|---|---|---|---|
| JP | 2019-101165 A | 6/2019 | | |
| KR | 2016090748 A * | 8/2016 | B41J 11/42 | |

*Primary Examiner* — Robert B Beatty
(74) *Attorney, Agent, or Firm* — Studebaker Brackett PLLC

(57) ABSTRACT

A fixing device includes a fixing member, a pressure roller, a discharge rollers pair, a discharge guide, and an actuator. The fixing member is heated by a heat source. The pressure roller forms a pressurized region. The discharge rollers pair includes an upper roller and a lower roller, and conveys the sheet passed through the pressurized region. The discharge guide guides the sheet passed through the pressurized region to the discharge rollers pair. The actuator includes a rotating shaft supported by the discharge guide rotatably and movably in an axial direction and a detection piece extending radially from the rotating shaft, and rotated by the sheet passed through the pressurized region to detect the sheet. The discharge guide has a slit in which the detection piece is housed to regulate a moving of the detection piece in a width direction of the sheet.

6 Claims, 8 Drawing Sheets

(56) References Cited

U.S. PATENT DOCUMENTS

| | | | | |
|---|---|---|---|---|
| 2014/0347684 | A1* | 11/2014 | Onishi | G03G 15/70<br>358/1.12 |
| 2019/0163121 | A1 | 5/2019 | Wada et al. | |
| 2023/0205125 | A1* | 6/2023 | Ohira | G03G 15/6573<br>399/328 |

* cited by examiner

FIXING DEVICE INCLUDING DISCHARGE GUIDE GUIDING SHEET PASSED THROUGH PRESSURIZED REGION AND IMAGE FORMING APPARATUS

INCORPORATION BY REFERENCE

This application is based on and claims the benefit of priority from Japanese patent application No. 2023-102353 filed on Jun. 22, 2023 which is incorporated by reference in its entirety.

BACKGROUND

The present disclosure relates to a fixing device which fixes a toner image on a sheet and an image forming apparatus including the fixing device.

As one of heating methods of a fixing member in the fixing device, a method of heating only a pressurized region by using a heating body (a flat heater) formed with a resistance heating element on a ceramic substrate is known. This method is excellent in energy saving because it has a high temperature increasing property and it heats only a necessary area. In this method, since the temperature increasing property of the fixing member is high, it is necessary to take measures to prevent the user from touching the fixing member for safety.

Therefore, the image forming apparatus may be provided with a fixing shutter movable to a closed position covering a heat source and an opened position exposing the heat source. The fixing shutter is arranged on a side where a sheet enters the pressurized region.

However, in the image forming apparatus described above, a shutter is not provided on a side where the sheet is discharged from the pressurized region. When a sheet jam occurs in the pressurized region, the jammed sheet is often removed from the discharge side. Therefore, it is necessary to prevent the heater and the fixing member from being exposed even on the discharge side.

In addition, a discharge guide for guiding the sheet to the discharge rollers pair may be provided on the side where the sheet is discharged from the pressurized area. The discharge guide may be provided with an actuator to detect the sheet passed through the pressurized area. In such a case, when the jammed sheet is removed from the discharge side during the treatment of the sheet jamming in the pressurized area, the sheet hits the actuator, and the position of the actuator may be displaced. Then, the sheet cannot be accurately detected by the actuator.

SUMMARY

A fixing device according to the present disclosure includes a fixing member, a pressure roller, a discharge rollers pair, a discharge guide, and an actuator. The fixing member is heated by a heat source. The pressure roller forms a pressurized region at which a sheet on which a toner image is transferred is heated and pressurized, between the fixing member and the pressure roller. The discharge rollers pair includes an upper roller and a lower roller, and conveys the sheet passed through the pressurized region. The discharge guide guides the sheet passed through the pressurized region to the discharge rollers pair. The actuator includes a rotating shaft supported by the discharge guide rotatably and movably in an axial direction and a detection piece extending radially from the rotating shaft, and rotated by the sheet passed through the pressurized region to detect the sheet. The discharge guide has a slit in which the detection piece is housed to regulate a moving of the detection piece in a width direction of the sheet.

An image forming apparatus according to the present disclosure includes an image forming part, the fixing device, and a cover. In the image forming part, a toner image is transferred to a sheet. The fixing device fixes the toner image transferred in the image forming part to the sheet. The cover is turnably provided and exposes the fixing device on a side where the sheet is discharged from the pressurized region, when the cover is opened. A power can be supplied even when the cover is opened.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an image forming apparatus and a fixing device of the present disclosure will be described.

Figure 1:
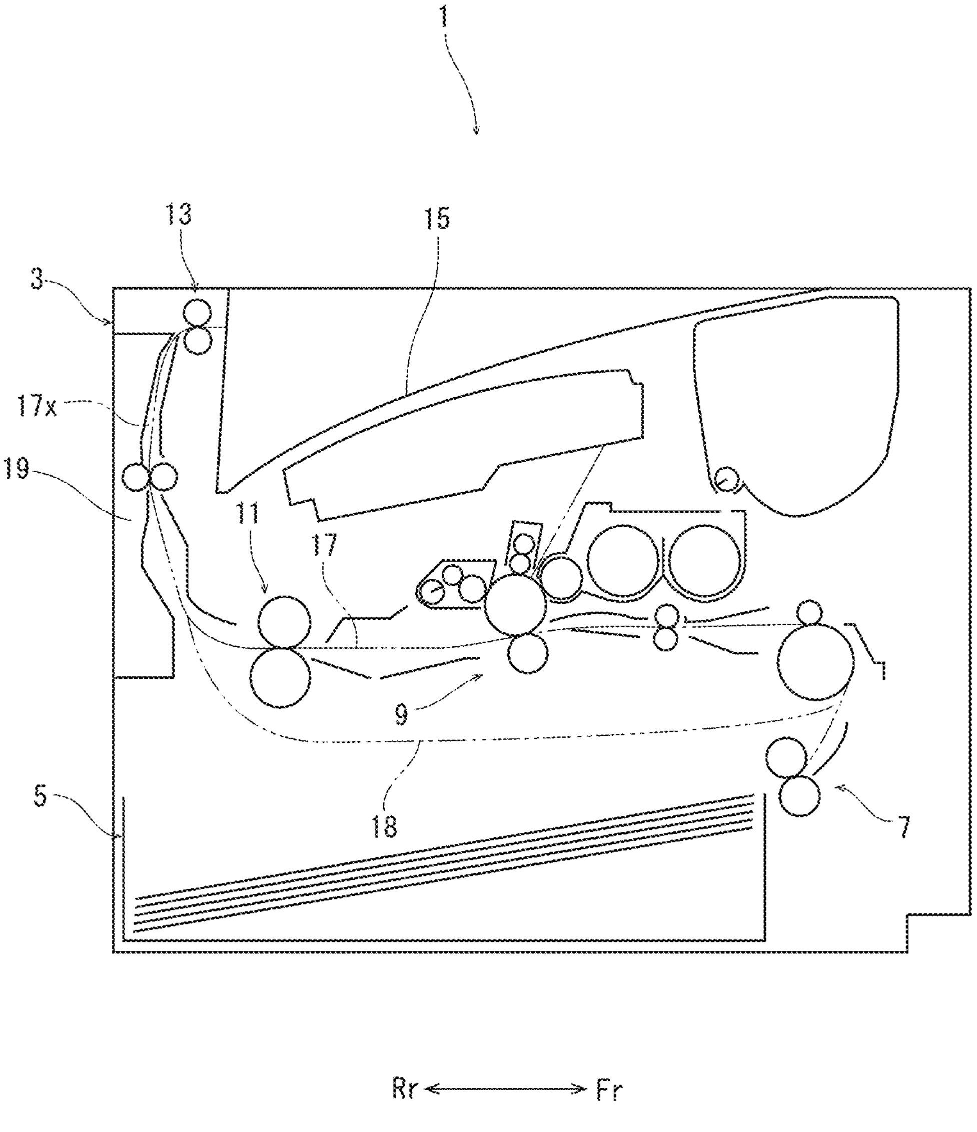
FIG. 1 is a front view schematically showing an inner configuration of an: image forming apparatus according to one embodiment of the present disclosure.

First, the entire configuration of the image forming apparatus 1 will be described with reference to FIG. 1. FIG. 1 is a front view schematically showing the inner structure of the image forming apparatus 1. In each figure, Fr, Rr, L, and R indicate the front side, rear side, left side, and right side of the image forming apparatus, respectively.

The image forming apparatus 1 includes a hollow housing 3. Inside the housing 3, a sheet feeding cassette 5 in which a sheet is stored, a sheet feeding device 7 which feeds the sheet from the sheet feeding cassette 5, an image forming part 9 which transfers a toner image to the sheet by an electrophotographic method, a fixing device 11 which fixes the toner image on the sheet, a discharge device 13 which discharges the sheet, and a sheet discharge tray 15 on which the discharged sheet is stacked are provided.

The sheet feeding cassette 5 is disposed in the lower position inside the housing 3. The sheet feeding device 7 is disposed above the front end portion of the sheet feeding cassette 5. The image forming part 9 is disposed on the rear side of the sheet feeding device 7. The fixing device 11 is disposed on the rear side of the image forming part 9. The discharge device 13 is disposed above the fixing device 11.

Inside the housing 3, a conveyance path 17 along which the sheet S is conveyed from the sheet feeding device 7 to the discharge device 13 through the image forming part 9 and the fixing device 11 is formed. The conveyance path 17 is formed so as to be curved upward from the sheet feeding device 7 and extend rearward toward the image: forming part 9, extend rearward from the image forming part 9 toward the fixing device 11, and curved upward from the fixing device 11 toward the discharge device 13. The direction in which the sheet is conveyed along the conveyance path 17 is defined as a conveyance direction, and a width direction (the left-and-right direction) of the sheet crossing the conveyance direction is defined as a width direction. Further, inside the housing 3, an inversion conveyance path 18 is formed, which branches from the conveyance path 17 on the downstream side of the fixing device 11 and merges with the conveyance path 17 on the downstream side of the sheet feeding device 7.

At the time of image forming operation, the sheet fed from the sheet feeding cassette 5 by the sheet feeding device 7 is conveyed to the image forming part 9 along the conveyance path 17, and a toner image is formed on the sheet in the image forming part 9. The sheet is conveyed to the fixing device 11 along the conveyance path 17, and the toner image is fixed to one surface of the sheet in the fixing device 11. The sheet is conveyed to the discharge device 13 along the conveyance path 17 and discharged to the sheet discharge tray 15 by the discharge device 13. In the case of duplex printing, the sheet on which the toner image is fixed on one surface by the fixing device 11 is switched back by the discharge device 13, and is conveyed again along the conveyance path 17 through the inversion conveyance path 18, and the toner image is formed on the other surface by the image forming part 9. Thereafter, the sheet is conveyed to the fixing device 11 along the conveyance path 17, and the toner image is fixed to the other surface of the sheet in the fixing device 11. The sheet is conveyed to the discharge device 13 along the conveyance path 17 and discharged to the discharge tray 15 by the discharge device 13.

The conveyance path 17*x* between the fixing device 11 and the discharge device 13 is formed between the rear surface of the housing 3 and a rear cover 19 rotatably supported on the rear surface of the housing 3 around the lower end. By turning (opening) the rear cover 19 downward, the downstream side surface of the fixing device 11 in the conveyance direction is exposed, and the conveyance path 17*x* between the fixing device 11 and the discharge device 13 is exposed. Thus, the sheet jam caused at the fixing device 11 and the conveyance path 17*x* can be treated.

As described above, the rear cover 19 is an example of a cover which can be opened and closed to expose the fixing device 11.

Figure 2A:
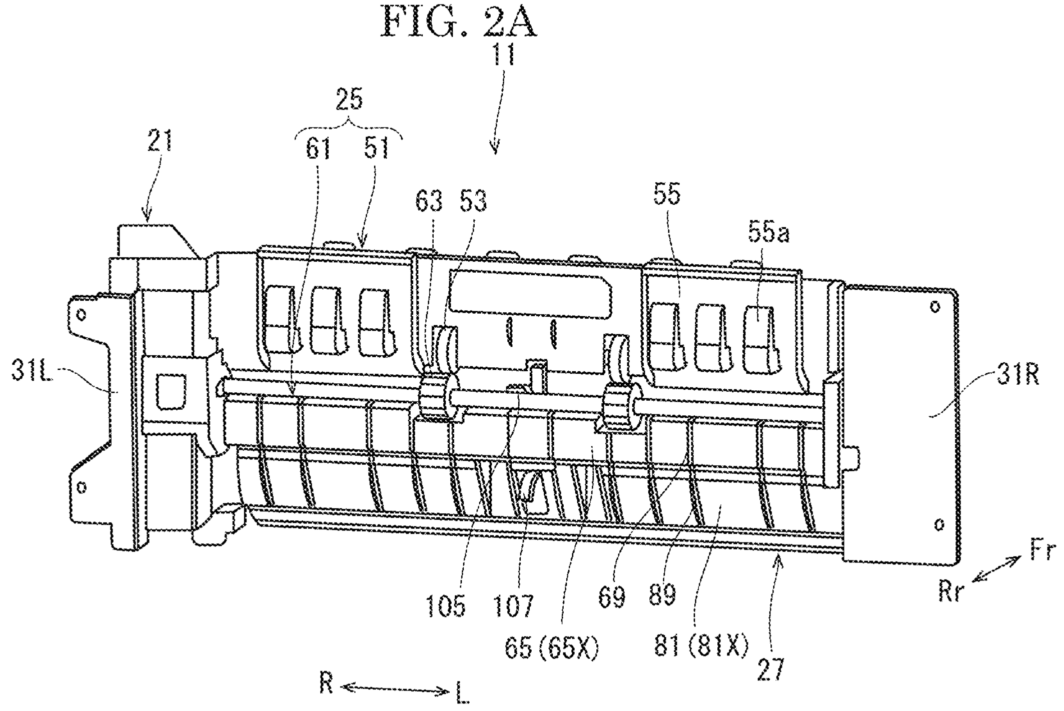
FIG. 2A is a perspective view showing a fixing device (in a state where a lower roller assembly is closed), viewed from the rear side, according to the embodiment of the present disclosure.
Figure 2B:
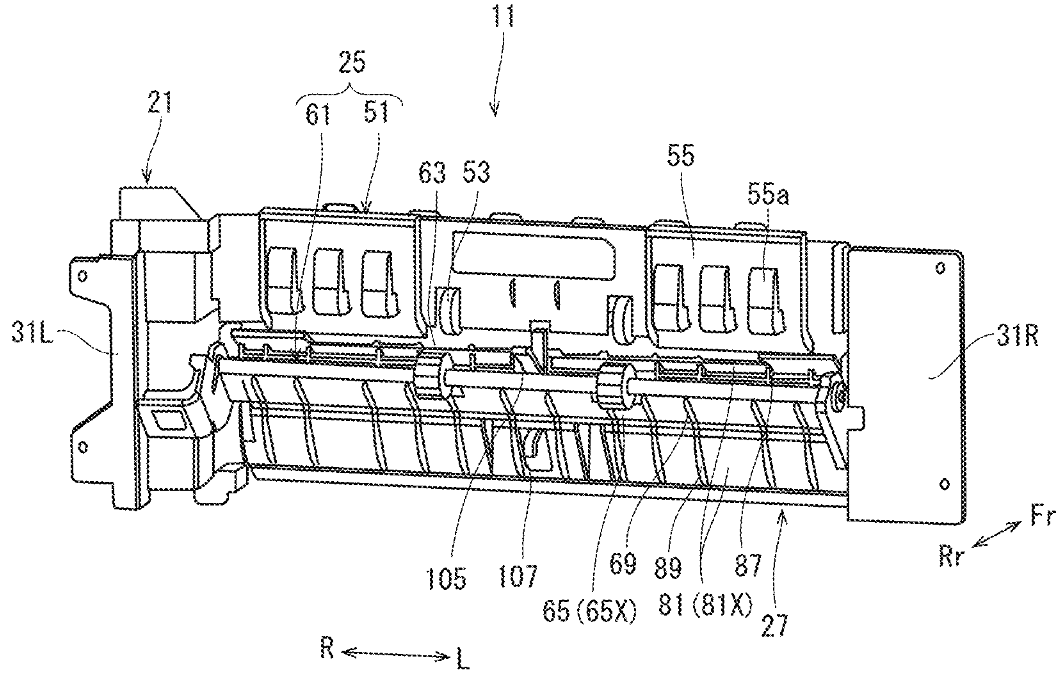
FIG. 2B is a perspective view showing the fixing device (in a state where the lower roller assembly is opened), viewed from the rear side, according to the embodiment of the present disclosure.
Figure 3A:
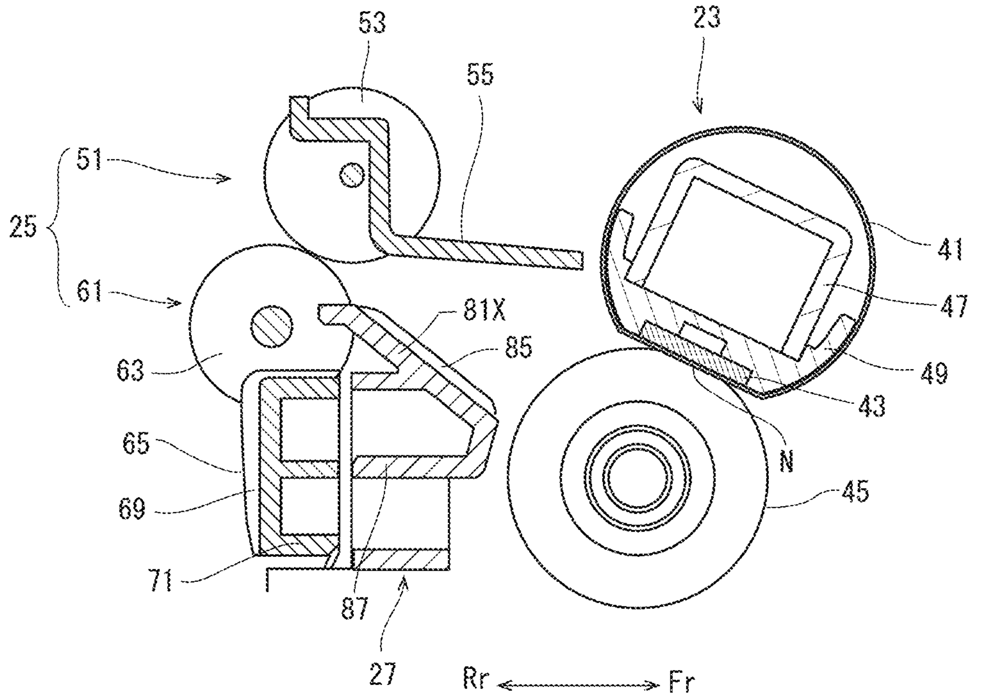
FIG. 3A is a sectional view showing the fixing device (in the state where the lower roller assembly is closed) according to the embodiment of the present disclosure.
Figure 3B:
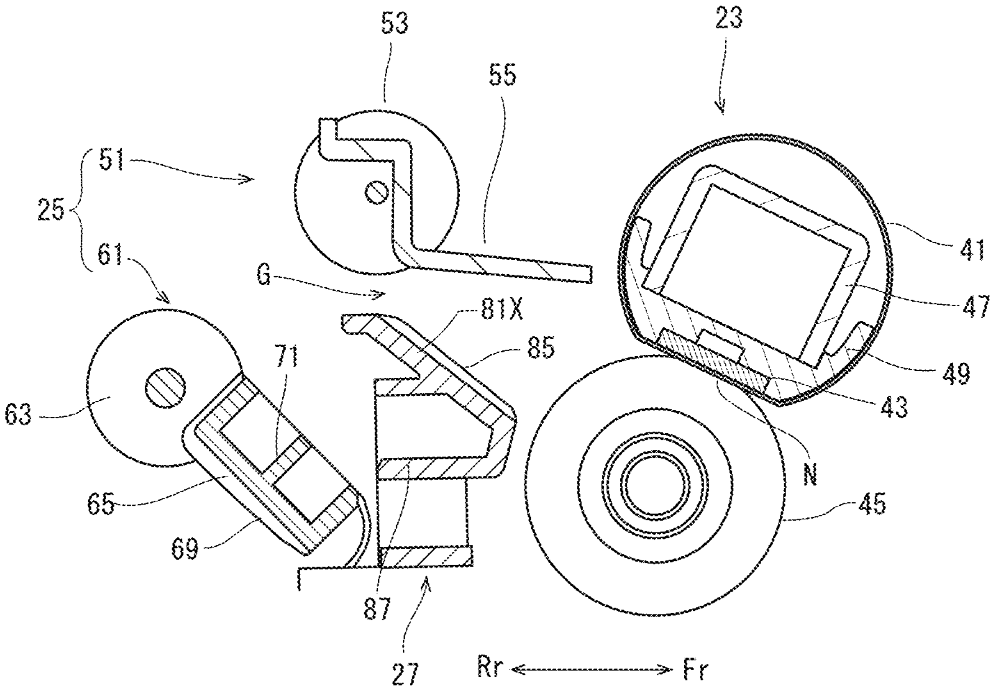
FIG. 3B is a sectional view showing the fixing device (in the state where the lower roller assembly is opened) according to the embodiment of the present disclosure.

Next, the fixing device 11 will be described with reference to FIG. 2A, FIG. 2B, FIG. 3A, FIG. 3B, and FIG. 4. FIG. 2A and FIG. 2B are perspective views showing the fixing device 11 viewed from the rear side, FIG. 3A and FIG. 3B are sectional views showing the fixing device 11, and FIG. 4 is a perspective view showing a fixing housing 21 and a discharge guide 27 viewed from the front side.

Figure 4:
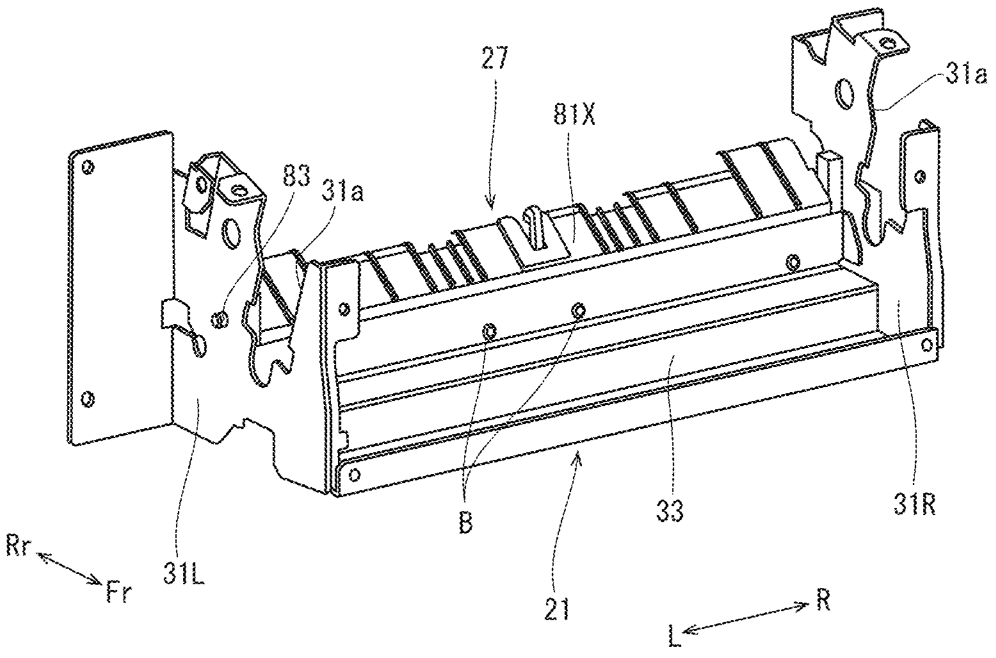
FIG. 4 is a perspective view showing a fixing housing and a fixing guide supported by the fixing housing, viewed from the front side, in the fixing device according to the embodiment of the present disclosure.

The fixing device 11 includes the fixing housing 21 (see FIG. 2A, FIG. 2B, and FIG. 4). The fixing housing 21 supports a fixing unit 23 (see FIG. 3A and FIG. 3B) which fixes the toner image on the sheet, a discharge rollers pair 25 (see FIG. 2A, FIG. 2B, FIG. 3A and FIG. 3B) which conveys the sheet passing through the fixing unit 23 along the conveyance path 17, and the discharge guide 27 (see FIG. 2A, FIG. 2B, FIG. 3A and FIG. 3B) which guides the sheet passing through the fixing unit 23 to the discharge rollers pair 25.

First, the fixing housing 21 will be described mainly with reference to FIG. 4. The fixing housing 21 has left and right side plates 31L and 31R facing in the width direction (the left-and-right direction), and a beam member 33 provided between the left and right side plates 31L and 31R. The left and right side plates 31L and 31R are formed with cutouts 31*a* directed downward from the upper end.

Next, the fixing unit 23 will be described mainly with reference to FIG. 3A and FIG. 3B. The fixing unit 23 includes a fixing belt 41 as the fixing member, a flat heater 43 as the heat source which heats the fixing belt 41, and a pressure roller 45 as the pressure member which forms a pressurizing region N at which the sheet is heated and pressurized between the fixing member and the pressure member.

The fixing belt 41 is an endless belt, and has a predetermined inner diameter and a width longer than the width of the sheet. The fixing belt 41 is made of flexible material, and has a base material layer, an elastic layer provided on the outer circumferential surface of the base material layer, and a release layer provided on the outer circumferential surface of the elastic layer. The base layer is made of metal such as SUS or Ni. The elastic layer is made of silicon rubber or the like. The release layer is made of PFA tube or the like. In some cases, a sliding layer is formed on the inner circumferential surface of the base layer. The sliding layer is made of polyimide amide, PTFE, or the like.

Both end portions of the fixing belt 41 are rotatably supported by end holders (not shown). Both the end holders are supported by the cutouts 31*a* (see FIG. 4) of the left and right side plates 31L and 31R of the fixing housing 21. A stay 47 passes through the hollow space of the fixing belt 41. Both the end portions of the stay 47 are supported by the end holders.

The flat heater 43 is a flat plate member, and has a width equal to the width of the fixing belt 41 and a predetermined length and a thickness. The flat heater 43 has a laminated structure in which a substrate made of stainless steel or ceramic, an electrical insulating layer made of glass, a resistance heating element layer having electrodes, and a protection layer are laminated in order from the rear side to the front side. The surface of the protective layer is formed flat to form a sliding surface in contact with the inner circumferential surface of the fixing belt 41. The resistance heating element layer is heated by being supplied with power through the electrode. As described above, the flat heater 43 has a high temperature increasing property and can heat only the sliding surface of the fixing belt 41.

The flat heater 43 is held by a holding member 49 supported by the end holders together with the stay 47. The holding member 49 is a substantially semi-cylindrical member, and has a width equal to the width of the fixing belt 41 and a predetermined length along the circumferential direction. The flat heater 43 is housed in a recess formed at the top portion of the holding member 49. The holding member 49 is made of heat-resistant resin such as liquid crystal polymer, for example.

The pressure roller 45 has a core metal, an elastic layer provided on the outer circumferential surface of the core metal, and a release layer provided on the outer circumferential surface of the elastic layer. The elastic layer is made of silicon rubber or the like. The release layer is made of PFA tube or the like.

The pressure roller 45 is rotatably supported on the right and left side plates 31L and 31R (see FIG. 4) of the fixing housing 21, and pressed against the flat heater 43 from below the fixing belt 41. Thus, the pressurized region N is formed between the fixing belt 41 and the pressure roller 45. The pressure roller 45 is driven by a motor (not shown) to be rotated. When the pressure roller 45 is driven by the motor and rotated, the fixing belt 41 is driven and rotated in a direction opposite to that of the pressure roller 45. Thus, the sheet conveyed along the conveyance path 17 passes through the pressurized region N.

Next, the discharge rollers pair 25 will be described. As shown in FIG. 2A, FIG. 2B, FIG. 3A and FIG. 3B, the discharge rollers pair 25 includes an upper roller assembly 51 and a lower roller assembly 61, and is supported by the fixing housing 21 on the downstream side of the pressurized region N in the conveyance direction.

First, the upper roller assembly 51 will be described. The upper roller assembly 51 includes an upper roller 53 and an upper guide plate 55. The upper roller 53 has a rotating shaft and two roller bodies arranged at a predetermined interval in the width direction on the rotating shaft. Both the end portions of the rotating shaft are rotatably supported by the right and left side plates 31L and 31R of the fixing housing 21. The rotating shaft is driven by a motor (not shown) to be rotated.

The upper guide plate 55 is arranged between the left and right side plates 31L and 31R of the fixing housing 21. As shown in FIG. 2A and FIG. 2B, on the rear surface (the downstream surface in the conveyance direction) of the upper guide plate 55, a plurality of ribs 55*a* along the upper-and-lower direction are provided at predetermined intervals in the width direction. In the lower end portion of the upper guide plate 55, two rectangular cutouts are formed with a predetermined interval at the center portion in the width direction. The two roller bodies of the upper roller 53 are housed in the two cutouts.

Figure 5:
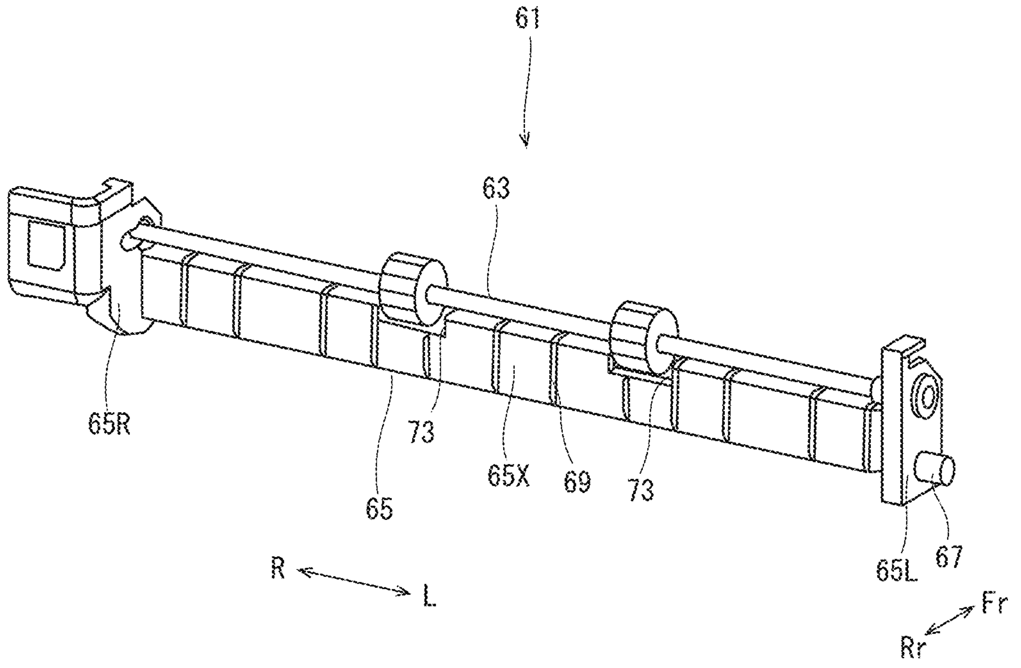
FIG. 5 is a perspective view showing the lower roller assembly, viewed from the rear side, in the fixing device according to the embodiment of the present disclosure.

Next, the lower roller assembly 61 will be described mainly with reference to FIG. 5. FIG. 5 is a perspective view showing the lower roller assembly 61 viewed from the rear side. The lower roller assembly 61 includes a lower roller 63 and a lower guide member 65 which supports the lower roller 63. The lower roller 63 has a rotating shaft and two roller bodies arranged at a predetermined interval in the width direction on the rotating shaft. The two roller bodies are arranged in the same position in the width direction as the two roller bodies of the upper roller 53 (see FIG. 2A).

The lower guide member 65 has left and right side plates 65L and 65R, and a lower guide plate 65X provided between the left and right side plates 65L and 65R. On the lower portions of the outer surfaces of the left and right side plates 65L and 65R, left and right fulcrum pins 67 are protruded along the width direction. The rear side surface (the downstream side surface in the conveyance direction) of the lower guide plate 65X forms a rear side guide surface along which the sheet is guided along the inversion conveyance path 18. On the rear guide surface, a plurality of guide ribs 69 along the upper-and-lower direction are formed at predetermined intervals in the width direction. On the opposite surface to the rear guide surface, a reinforcing rib 71 (not shown in FIG. 5, see FIG. 3A and FIG. 3B) along the upper-and-lower direction and the width direction is formed. In the upper end portion of the lower guide plate 65X, two rectangular cutouts 73 are formed with a predetermined interval at the center portion in the width direction.

Both the end portions of the rotating shaft of the lower roller 63 are rotatably supported by the upper end portions of the left and right side plates 65L and 65R of the lower guide member 65. The two roller bodies are housed in the two cutouts 73 of the lower guide plate 65X.

The right and left fulcrum pins 67 of the lower guide 65 inserted into member are the substantially central portions in the height direction of the left and right side plates 31L and 31R of the fixing housing 21. Thus, the lower guide member 65 is turnably supported by the left and right side plates 31L and 31R. The lower roller assembly 61 is turned between a conveying position where the roller bodies of the lower roller 63 are in contact with the roller bodies of the upper roller 53 of the upper roller assembly 51 (see FIG. 2A and FIG. 3A) and an opening position where the roller bodies of the lower roller 63 is rearwardly separated from the roller bodies of the upper roller 53 (see FIG. 2B and FIG. 3B). The lower roller assembly 61 is immovably held at the conveying position and the opening position respectively by a holding mechanism (not shown). As described above, the lower guide member 65 is an example of the support member which rotatably supports one discharge roller (the lower roller 63) of the discharge rollers pair 25 and is turnable in a direction where one discharge roller is separated away from the other discharge roller (the upper roller 53).

Figure 6:
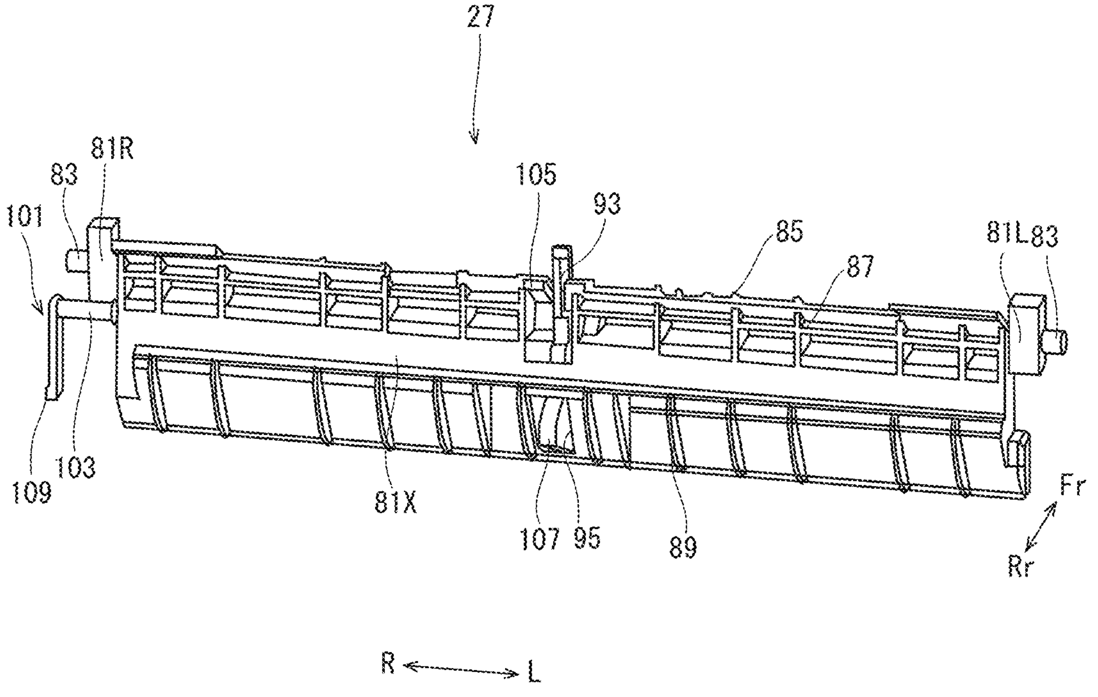
FIG. 6 is a perspective view showing the fixing guide, viewed from the rear side, in the fixing device according to the embodiment of the present disclosure.

Next, the discharge guide 27 will be described mainly with reference to FIG. 6. FIG. 6 is a perspective view showing the discharge guide 27 viewed from the rear side. The discharge guide 27 includes left and right side plates 81L and 81R, and a guide plate 81X provided between the left and right side plates 81L and 81R. On the upper end portions of the outer surfaces of the left and right side plates 81L and 81R, right and left bosses 83 are protruded along the width direction.

The front surface (the upstream surface in the conveyance direction) of the upper half of the guide plate 81X forms a front guide surface inclined upward from the pressurized region N toward the discharge rollers pair 25. Along the front guide surface, the sheet is guided from the pressurized region N toward the discharge rollers pair 25. A plurality of guide ribs 85 along the upper-and-lower direction are formed on the front guide surface at predetermined intervals in the width direction (see also FIG. 3A and FIG. 3B). On the opposite surface to a the front guide surface, reinforcing rib 87 is formed along the upper-and-lower direction and the left-and-right lateral direction (see also FIG. 3A and FIG. 3B).

The rear side surface (the downstream side surface in the conveyance direction) of the lower half of the guide plate 81X forms a rear guide surface along which the sheet is guided when the duplex printing is performed. As shown in FIG. 6, a plurality of guide ribs 89 along the upper-and-lower direction are formed on the rear guide surface at predetermined intervals in the width direction. On the opposite surface to the rear guide surface, a reinforcing rib (not shown) along the upper-and-lower direction and the left-and-right direction is formed.

In the center portion in the width direction of the upper end portion of the guide plate 81X, a slit 93 cut out from the upper end is formed. Further, a rectangular opening 95 is formed in the center portion in the width direction of the lower end portion of the guide plate 81X.

As shown in FIG. 3A and the others, the discharge guide 27 is arranged between the fixing unit 23 and the discharge rollers pair 25, such that the upper half of the guide plate 81X is positioned closer to the fixing unit 23 than the lower roller assembly 61, and the lower half (not shown in FIG. 3A and FIG. 3B) of the guide plate 81X is positioned below the lower roller assembly 61 (see also FIG. 2A and FIG. 2B).

As shown in FIG. 4, the left and right bosses 83 of the left and right side plates 81L and 81R of the discharge guide 27 are inserted into the left and right side plates 31L and 31R of the fixing housing 21. Further, the center portion of the guide plate 81X of the discharge guide 27 in the width direction is fastened to the beam member 33 of the fixing housing 21 by screws B.

As shown in FIG. 2A and FIG. 3A, when the lower roller assembly 61 of the discharge rollers pair 25 is turned to the conveying position, the lower half of the discharge guide 27 is exposed below the lower roller assembly 61. Then, the rear guide surface of the lower guide plate 65X of the lower guide member 65 of the lower roller assembly 61 and the rear guide surface of the guide plate 81X of the discharge guide 27 are continuous. In particular, as shown in FIG. 2A, the guide ribs 69 and 89 of both the guide surfaces are continuous in the conveyance direction.

As shown in FIG. 2B and FIG. 3B, when the lower roller assembly 61 is turned to the opening position, the upper roller 53 of the upper roller assembly 51 is separated from the lower roller 63 of the lower roller assembly 61. And, between the upper and lower rollers 53 and 63, the upper half (the rear reinforcing rib 87) of the guide plate 81X of the discharge guide 27 and a gap G (see FIG. 3B) between the upper guide plate 55 of the upper roller assembly 51 and the guide plate 81X of the discharge guide 27 are exposed. The gap G is communicated with the pressurized region N. The gap G is set so that the user's finger cannot insert it (for example, 5 to 8 mm).

Figure 7:
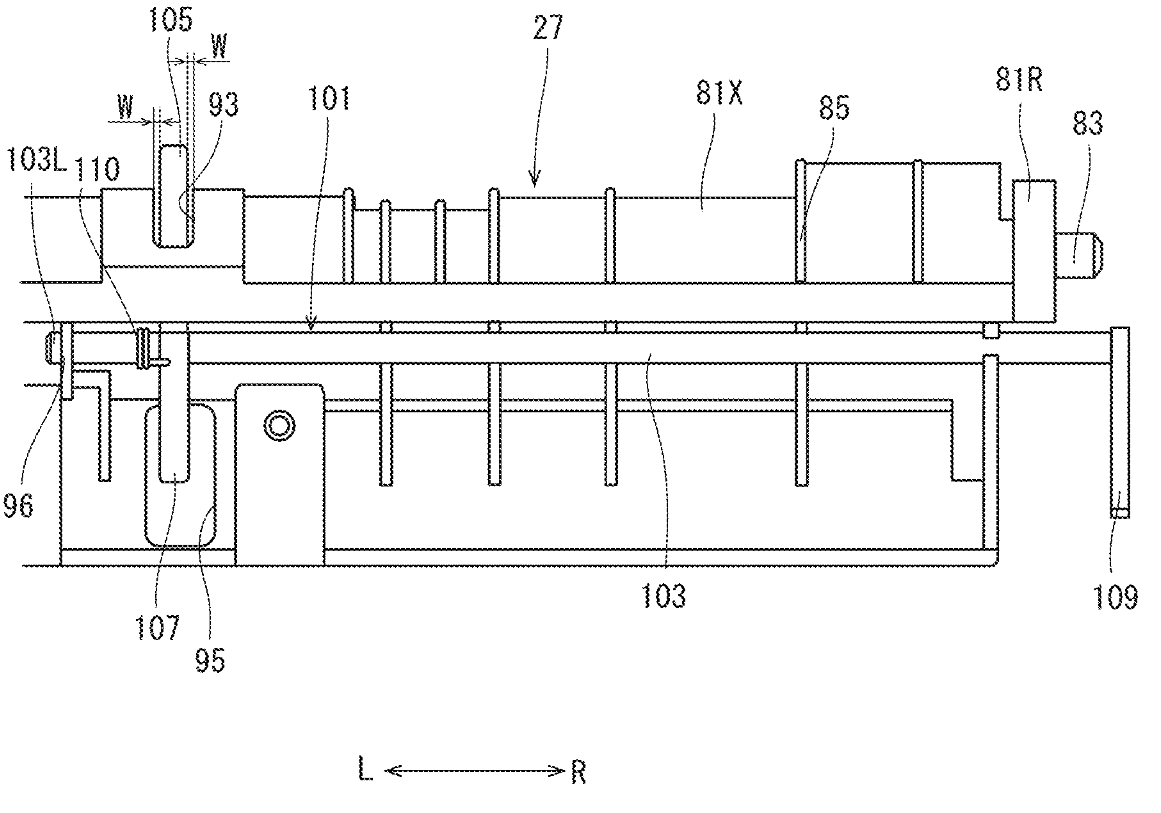
FIG. 7 is a front view showing the fixing guide, viewed from the front side, in the fixing device according to the embodiment of the present disclosure.
Figure 8:
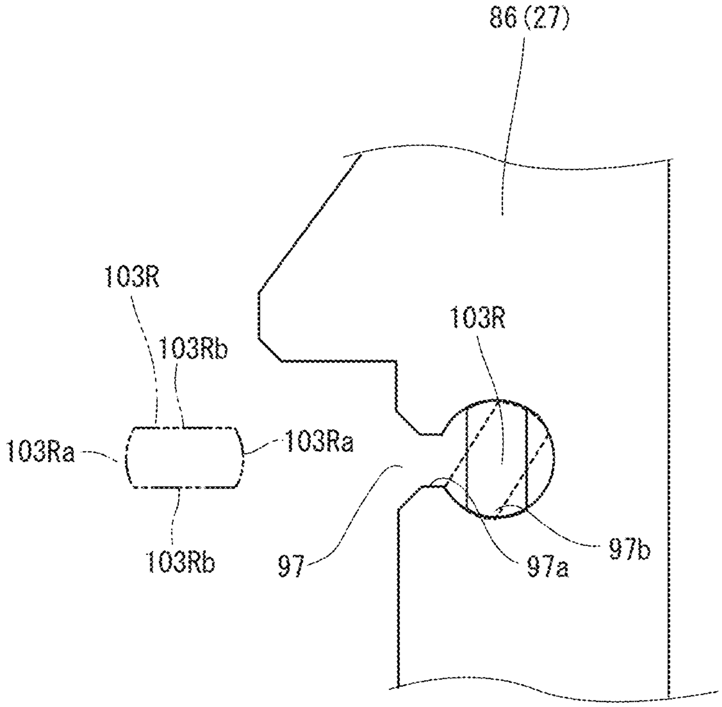
FIG. 8 is a view schematically showing a configuration in which a rotating shaft of an actuator is supported by the discharge guide, in the fixing device according to the embodiment of the present disclosure.

Next, an actuator 101 supported by the discharge guide 27 will be described mainly with reference to FIG. 7 and FIG. 8. FIG. 7 is a front view showing the discharge guide 27 viewed from the front side. FIG. 8 is a view schematically showing a configuration in which a rotating shaft 103 of the actuator 101. The actuator 101 rotates by being in contact with the sheet, and detects the passage of the sheet.

The actuator 101 has a rotating shaft 103, a main actuator piece 105 (a detection piece) and a duplex printing actuator piece 107 (a detection piece) extending radially from the rotating shaft 103, and a detected piece 109. The rotating shaft 103 has a length of about half the width of the guide plate 81X of the discharge guide 27. The main actuator piece 105 and the duplex printing actuator piece 107 are provided at the left end portion of the rotating shaft 103 so as to extend in opposite radial directions. The detected piece 109 is provided at the right end portion of the rotating shaft 103.

The rotating shaft 103 is rotatably supported on the upper end portion of the front surface (the upstream surface in the conveyance direction) of the guide plate 81X of the discharge guide 27. More specifically, a left supporting portion 103L is formed at the left end portion of the rotating shaft 103 on the left side of the main actuator piece 105 and the duplex printing actuator piece 107. A circular left bearing hole 96 for supporting the left support portion 103L is formed in the discharge guide 27. The left supporting portion 103L can be inserted into the left bearing hole 96 along the axial direction of the rotating shaft 103. A biasing member 110 is inserted on the rotating shaft 103 between the left supporting portion 103L, and the main actuator piece 105 and the duplex printing actuator piece 107. As an example, the biasing member 110 is a torsional coil spring. As seen from the right side of FIG. 7, the biasing member 110 biases the actuator 101 in the counterclockwise direction around the rotating shaft 103.

At the right end portion of the rotating shaft 103, a right supporting portion 103R is formed on the left side of the detected piece 109. As shown in FIG. 8, the right supporting portion 103R has a shape in which a circle is cut off by two parallel straight lines as seen from the axial direction, and has a pair of opposing arc surfaces 103Ra and a pair of opposing flat surfaces 103Rb. The discharge guide 27 has a side plate 86 formed along a direction orthogonal to the rotating shaft 103. A right bearing portion 97 for supporting the right supporting portion 103R is formed in the side plate 86. The right bearing portion 97 has a groove portion **97*a* along the direction orthogonal to the axial direction of the rotating shaft 103 from the edge of the side plate 86 and an opening portion 97*b* communicating with the groove portion 97*a*. A width (height) of the groove portion 97*a* is substantially equal to a distance between both the flat surfaces 103Rb of the right supporting portion 103R. An inner diameter of the opening portion 97*b* is substantially equal to a diameter of the virtual circle formed by both the arc surfaces 103Ra of the right supporting portion 103**R.

Next, an attaching of the actuator 101 to the discharge guide 27 will be described. First, the biasing member 110 is inserted through the rotating shaft 103. Then, the left supporting portion 103L is arranged on the right side of the left bearing hole 96, the rotating shaft 103 is rotated in a direction against the biasing force of the biasing member 110, and the right supporting portion 103R is inserted into the right bearing portion 97. More specifically, the right supporting portion 103R is held in a posture in which both the flat surfaces 103Rb are horizontal (see the double-dashed line in FIG. 8) and inserted into the groove portion **97*a* of the right bearing portion 97 along the direction along both the flat surfaces 103Rb. When the right support portion 103R reaches the opening portion 97*b* of the right bearing portion 97 (the arc surface 103Ra is in contact with the inner surface of the opening portion 97*b*), the left supporting portion 103L is inserted into the left bearing hole 96. Then. the rotating shaft 103 is moved in the axial direction until the main actuator piece 105 overlaps the slit 93 of the guide plate 81X. Finally, the main actuator piece 105 is biased by the biasing member 110 and housed in the slit 93 (see the solid line in FIG. 8**).

The main actuator piece 105 is thus housed in the slit 93 of the guide plate 81X and protrudes upward from the guide plate 81X (see also FIG. 6). The width of the main actuator piece 105 is 4 mm in one example, and the width W of the slit 93 is 6 mm in one example. That is, a gap W of 1 mm is opened between the main actuator piece 105 and both sides of the slit 93 in the width direction. The duplex printing actuator piece 107 is housed in the opening 95 of the guide plate 81X and protrudes rearward (the downstream side in the conveyance direction) of the guide plate 81X (see also FIG. 6). The detected piece 109 protrudes outward (rearward) in the width direction of the guide plate 81X. The rotating shaft 103 is supported by the left bearing hole 96 and the right bearing portion 97 rotatably and movably in the axial direction. However, since the axial movement of the main actuator piece 105 is regulated within the width W of the slit 93, the axial movement of the actuator 101 is regulated.

Next, the operation of the actuator 101 will be described. The sheet passed through the pressurized region N is guided along the front guide surface of the discharge guide 27 and then abuts against the main actuator piece 105. Then, the main actuator piece 105 is pushed by the sheet, and the rotating shaft 103 is rotated (see the dotted line in FIG. 8). The detected piece 109 is rotated together with the rotating shaft 103. The fixing housing 21 is provided with an optical sensor (not shown) for blocking or forming an optical path by the detected piece 109. The optical sensor transmits a signal to a control part (not shown) by blocking and forming the optical path by the detected piece 109. Based on the signal, the control part determines that the sheet is passed through the pressurized region N.

Similarly, when the sheet conveyed in the inversion conveyance path 18 abuts against the duplex printing actuator piece 107, the duplex printing actuator piece 107 is pushed by the sheet, and the rotating shaft 103 is rotated together with the detected piece 109. The optical sensor transmits a signal to the control part by blocking and forming the optical path by the detected piece 109. Based on the signal, the control part determines that the sheet is passed through the inversion conveyance path 18.

The fixing operation of the fixing device 11 having the above configuration will be described with reference to FIG. 2A, FIG. 2B, FIG. 3A, FIG. 3B and the others. First, in the fixing unit 23, the pressure roller 45 is driven by the motor to be rotated, and the fixing belt 41 is rotated in a direction opposite to the rotation direction of the pressure roller 45 (the clockwise direction in FIG. 3A) in accordance with the pressure roller 45. At the same time, the flat heater 43 is driven to heat the fixing belt 41. The fixing belt 41 is heated to a predetermined control temperature (for example, 160° C.). After the fixing belt 41 is heated in this manner, the sheet S on which the toner image is transferred is conveyed to the pressurized region N.

When the sheet S passes through the pressurized region N, it is heated by the fixing belt 41 and pressurized by the pressure roller 45 and the fixing belt 41 to fix the toner image to the sheet S. The sheet S on which the toner image is fixed is guided from the pressurized region N to the discharge rollers pair 25 along the front guide surface of the guide plate 81X of the discharge guide 27. Thereafter, the sheet is conveyed along the conveyance path 17 toward the discharge device 13 by the discharge rollers pair 25. At this time, when the sheet is brought into contact with the main actuator piece 105 of the actuator 101 and the rotating shaft 103 is rotated, it is determined by the control part that the sheet is passed through the pressurized region N.

When a sheet jam occurs in the pressurized region N, the rear cover 19 (see FIG. 1) is first opened. Then, as shown in FIG. 2A, the rear surface of the fixing device 11 (the downstream surface in the conveyance direction) is exposed. Thereafter, the lower roller assembly 61 is turned from the conveying position to the opening position. Then, as shown in FIG. 2B and FIG. 3B, the gap G between the upper guide plate 55 of the upper roller assembly 51 and the guide plate 81X of the discharge guide 27 is exposed. The sheet can be removed through the gap G.

As described above, according to the fixing device 11 of the present disclosure, since the height of the gap G is set such that the user's finger does not enter, the possibility that the user touches the fixing belt 41 is low. That is, even if the lower roller assembly 61 is turned to the opening position, since the discharge guide 27 exists on the rear side of the fixing unit 23, the gap G through which the fixing belt 41 and the pressurized region N are exposed can be made as narrow as possible. Specifically, it can be made so narrow that the user's finger cannot enter. Therefore, the sheet jam can be safely treated even when the flat heater 43 having a high temperature increasing property is used.

Further, the left and right bosses 83 of the left and right side plates 81L and 81R of the discharge guide 27 are inserted into the left and right side plates 31L and 31R of the fixing housing 21, and the guide plate 81X is screw-fastened to the beam member 33 of the fixing housing 21 (see FIG. 4). Further, the reinforcing ribs 87 along the upper-and-lower direction and the width direction are formed on the front and rear surfaces of the discharge guide 27 to increase the rigidity of the discharge guide 27. Therefore, even if the discharge guide 27 is pushed toward the pressurized region N when the finger is inserted into the gap G, the discharge guide 27 is difficult to be deformed and the gap G is difficult to be opened. Therefore, the sheet jam treatment can be performed more safely.

Furthermore, since the distance between the main actuator piece 105 and both sides of the slit 93 in the width direction is 1 mm, it is impossible to insert the finger through this gap. In this way, the clearance accessible to the pressurized region N and the fixing belt 41 can be set as narrow as possible, thereby increasing the safety of the sheet jam treatment.

Moreover, even when the flat heater 43 is used, the sheet jam can be safely treated in this way, so that, for example, there is no need to provide an interlock switch to the rear cover 19. That is, when the flat heater 43 is used, in consideration of safety, when the rear cover 19 is opened during the sheet jam treatment in the pressurized region N, the interlock switch may be activated to turn off the power of the image forming apparatus 1. In the present disclosure, since access to the pressurized region N and the fixing belt 41 is difficult as described above, the sheet jam treatment can be performed even when the power supply is turned on. Therefore, workability of the sheet jam treatment can be enhanced.

Furthermore, since the above description of embodiments of the present disclosure describes preferred embodiments of the present disclosure, various technically preferable limitations may be given, but the technical scope of the present disclosure is not limited to these aspects unless there is a description specifically limiting the present disclosure.

The invention claimed is:

1. A fixing device comprising:

a fixing member heated by a heat source;

a pressure roller forming a pressurized region at which a sheet on which a toner image is transferred is heated and pressurized, between the fixing member and the pressure roller;

a discharge rollers pair including an upper roller and a lower roller for conveying the sheet passed through the pressurized region;

a discharge guide guiding the sheet passed through the pressurized region to the discharge rollers pair; and an actuator including a rotating shaft supported by the discharge guide rotatably and movably in an axial direction and a detection piece extending radially from the rotating shaft, and rotated by the sheet passed through the pressurized region to detect the sheet, wherein the discharge guide has a slit in which the detection piece is housed to regulate a moving of the detection piece in a width direction of the sheet, and a gap between the actuator and the slit in the width direction is 1 mm.

2. The fixing device according to claim 1, wherein the heat source is a flat heater.

3. The fixing device according to claim 1, further comprising:

a housing having a pair of side plates facing in a width direction of the sheet and a beam member provided between the side plates, and supporting the fixing member and the pressure member, wherein the discharge guide has a pair of bosses protruding in opposite directions in the width direction, and the discharge guide is fastened to the beam member with a screw and the bosses are inserted into through-holes of the side plates.

4. The fixing device according to claim 1, wherein the discharge guide has a reinforcing rib.

5. An image forming apparatus comprising:

an image forming part in which a toner image is transferred to a sheet;

the fixing device which fixes the toner image transferred in the image forming part to the sheet, according to claim 1; and a cover which is turnably provided and exposes the fixing device on a side where the sheet is discharged from the pressurized region, when the cover is opened, wherein a power can be supplied even when the cover is opened.

6. A fixing device comprising:

a fixing member heated by a heat source;

a pressure roller forming a pressurized region at which a sheet on which a toner image is transferred is heated and pressurized, between the fixing member and the pressure roller;

a discharge rollers pair including an upper roller and a lower roller, and conveying the sheet passed through the pressurized region;

a discharge guide guiding the sheet passed through the pressurized region to the discharge rollers pair; and an actuator including a rotating shaft supported by the discharge guide rotatably and movably in an axial direction and a detection piece extending radially from the rotating shaft, and rotated by the sheet passed through the pressurized region to detect the sheet, wherein a supporting member which is disposed on a farther side from the pressurized area than the discharge guide, rotatably supports the lower roller of the discharge rollers pair and is turnable in a direction in which the lower roller is separated away from the upper roller, and wherein the discharge guide is configured to form a gap of 5 to 8 mm through which a finger cannot be inserted, between the discharge guide and the upper roller.

* * * * *